(12) United States Patent
Park et al.

(10) Patent No.: US 8,530,088 B2
(45) Date of Patent: Sep. 10, 2013

(54) METHOD OF PRODUCING NANOPARTICLES, NANOPARTICLES, AND LITHIUM BATTERY COMPRISING ELECTRODE COMPRISING THE NANOPARTICLES

(75) Inventors: Jin-hwan Park, Seoul (KR); Tae-sung Kim, Suwon-Si (KR); Kwang-su Kim, Suwon-Si (KR)

(73) Assignee: Samsung Electronics Co., Ltd. and Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 456 days.

(21) Appl. No.: 12/418,169

(22) Filed: Apr. 3, 2009

(65) Prior Publication Data
US 2009/0253037 A1   Oct. 8, 2009

(30) Foreign Application Priority Data

Apr. 4, 2008   (KR) .................. 10-2008-0031710

(51) Int. Cl.
*C22B 5/00* (2006.01)
(52) U.S. Cl.
USPC ....... 429/218.1; 75/10.19; 148/400; 148/421; 423/298; 423/348; 423/349
(58) Field of Classification Search
USPC .............. 75/10.19; 148/400, 421; 423/298, 423/348, 349; 429/218.1
See application file for complete search history.

(56) References Cited

U.S. PATENT DOCUMENTS

| 6,913,825 | B2 | 7/2005 | Ostafin et al. |
| 7,297,446 | B2 * | 11/2007 | Fukui et al. ............... 429/233 |
| 7,394,091 | B2 | 7/2008 | Isobe et al. |
| 2005/0061785 | A1 | 3/2005 | Schroder et al. |
| 2007/0264574 | A1 | 11/2007 | Kim et al. |
| 2008/0038635 | A1 | 2/2008 | Sheem et al. |
| 2008/0271987 | A1 | 11/2008 | Noh et al. |
| 2010/0258761 | A1 | 10/2010 | Kim et al. |

FOREIGN PATENT DOCUMENTS

| JP | 2004-300530 | 10/2004 |
| KR | 10-2006-0113671 | 11/2006 |
| KR | 10-2007-0041900 | 4/2007 |
| KR | 10-2007-0056765 | 6/2007 |
| KR | 10-2007-0069306 | 7/2007 |
| KR | 10-2007-0076686 | 7/2007 |
| KR | 10-2007-0079980 | 8/2007 |
| KR | 10-2007-0109118 | 11/2007 |
| KR | 10-2008-0098184 | 11/2008 |
| WO | WO 2004/007636 | 1/2004 |

OTHER PUBLICATIONS

Tong et al., 'Visible Electroluminescence from Nanocrystallites of Silicon films Prepared by Plasma Enhanced Chemical Vapor Deposition' in appl. Phys. Lett. vol. 69 #5 Jul. 29, 1998 pp. 596-598.*
Tanenbaum et al., 'Nanoparticle Deposition in Hydrogenated Amorphous Silicon Films During RF Plasma Deposition' in Appl. Phys. Lett. vol. 68 #12 Mar. 18, 1996 pp. 1705-1707.*
Mitas et al., Effect of Surface Reconstruction on the Structural Prototypes of Ultrasmall Ultrabright Si29 Particles' in Appl. Phys. Lett. vol. 78 #13 Mar. 26, 2001 pp. 1918-1920.*
Belomoin et al., Oxide and Hydrogen Capped Ultrasmall Blue Luminescent Si Nanoparticles' in Appl. Phys. Lett. vol. 77 #6 Aug. 7, 2000 pp. 779-781.*

* cited by examiner

*Primary Examiner* — Stuart Hendrickson
(74) *Attorney, Agent, or Firm* — Stein IP, LLC

(57) ABSTRACT

A method of preparing nanoparticles includes using low-temperature plasma and a pulsed second process gas. Nanoparticles having uniform sizes and nanoparticles having a core-shell structure may be formed. A lithium battery includes an electrode that includes the nanoparticles.

16 Claims, 8 Drawing Sheets

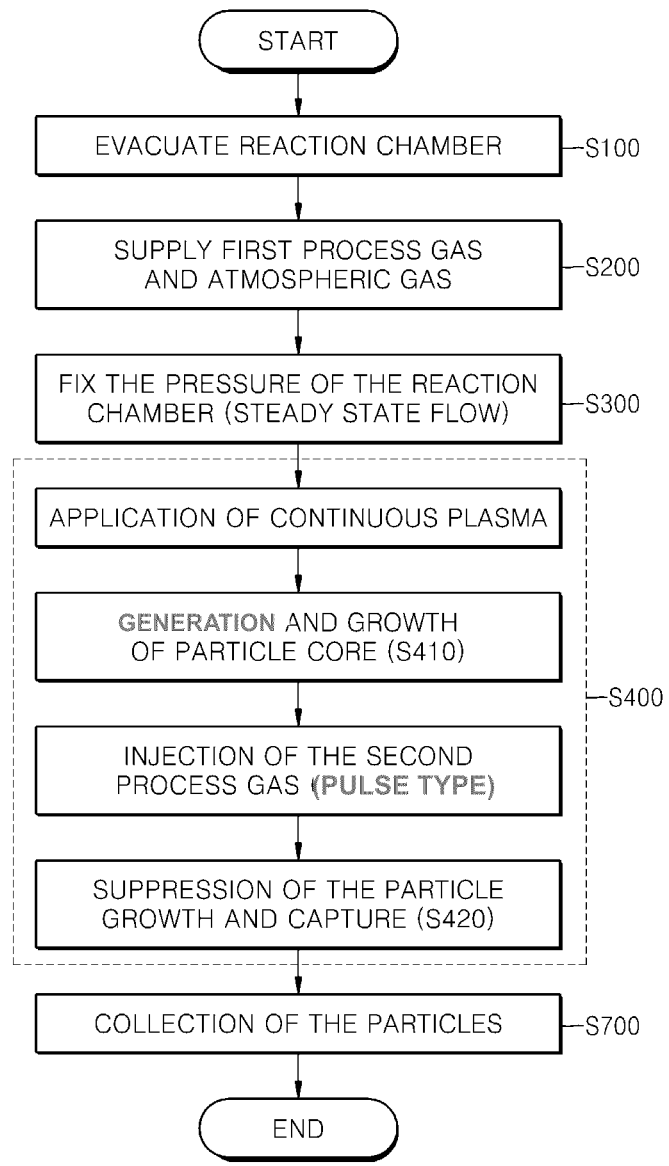

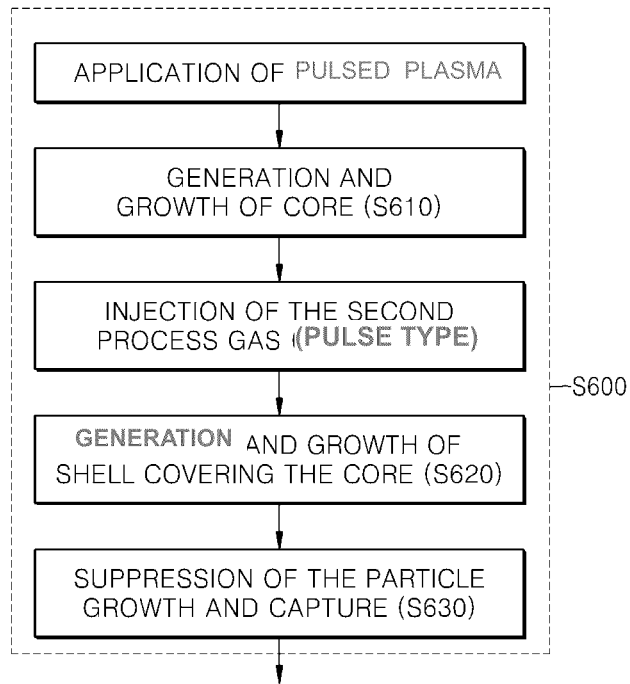
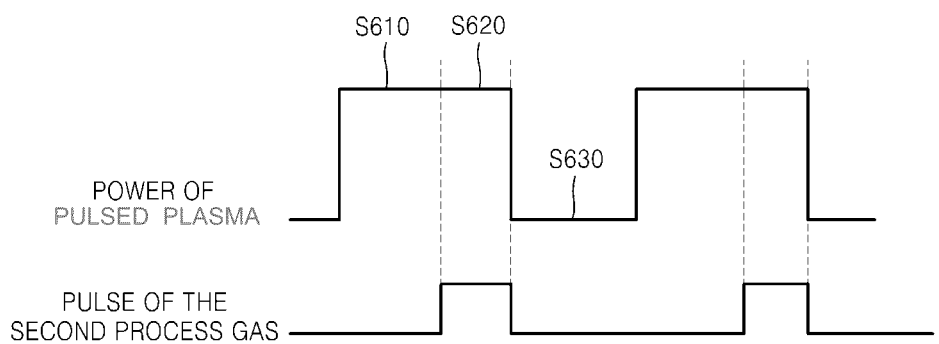

METHOD OF PRODUCING NANOPARTICLES, NANOPARTICLES, AND LITHIUM BATTERY COMPRISING ELECTRODE COMPRISING THE NANOPARTICLES

CROSS-REFERENCE TO RELATED APPLICATIONS

This application claims the benefit of Korean Patent Application No. 10-2008-0031710, filed on Apr. 4, 2008, in the Korean Intellectual Property Office, the disclosure of which is incorporated herein in its entirety by reference.

BACKGROUND

1. Field

One or more embodiments relate to a method of producing nanoparticles using low-temperature plasma, to nanoparticles, and to a lithium battery including an electrode including the nanoparticles. More particularly, one or more embodiments relate to a method of producing nanoparticles using low-temperature plasma that is applied in a continuous manner or in a pulse manner and a second process gas that is supplied in a pulse manner, to nanoparticles having specific characteristics, and to a lithium battery including an electrode including the nanoparticles.

2. Description of the Related Art

The term "nanoparticle" refers to an ultra fine particle on a nanometer scale (one billionth of a meter, equivalent to the combined size of hundreds of atoms or molecules). In the present specification, the term "ultra fine particle" refers to a particle having an average diameter of about 250 nm or less. Nanoparticles exhibit a surface-area-increase-effect and a capillary effect, which are generated when the size of nanoparticles decreases. The surface-area-increase-effect significantly affects chemical reactions and catalyst reactions that are associated with a surface phenomenon and the adsorption/desorption behavior of different components. The capillary effect changes basic properties of particles to generate a new phenomenon. Accordingly, nanoparticles can be used in a wide range of applications.

As various small portable electronic devices including portable computers, portable communications devices, camcorders etc., are manufactured in small sizes and have a light-weight structure, a demand for small, lightweight, thin, and high-capacity batteries as a driving power source is increasing. Accordingly, research into how nanoparticles may be used as an electrode active material of rechargeable secondary batteries such as lithium batteries including lithium metal batteries, lithium ion batteries, and lithium polymer batteries is actively being conducted.

Among currently available electrode active materials, lithium can provide batteries having a high power capacity per unit weight, and a high electronegativity and a high voltage. Currently, much research is focused on how such characteristics can be obtained by using nanoparticles as an electrode active material of lithium batteries.

However, ease of performing process control during manufacture of nanoparticles, reproducibility, economical efficiency, and uniform nanoparticle distribution have not yet reached desired levels. Accordingly, it would be desirable to improve these factors. In addition, to enhance applicability of nanoparticles, it would be desirable to have nanoparticles formed of various components or nanoparticles having various structures, such as a core-shell structure.

SUMMARY

One or more embodiments include a method of producing nanoparticles.

One or more embodiments include nanoparticles having uniform sizes and which do not agglomerate.

One or more embodiments include nanoparticles having a core-shell structure.

Additional aspects will be set forth in part in the description which follows and, in part, will be apparent from the description, or may be learned by practice of the invention.

One or more embodiments may include a method of producing nanoparticles, the method including: providing an apparatus to produce nanoparticles, wherein the apparatus includes: a reaction chamber including: a gas inlet, a nanoparticle housing device, and a division member that is grounded and divides the reaction chamber into a nanoparticle forming region and a nanoparticle housing region; a gas supply unit that supplies a first process gas, a second process gas and an atmospheric gas into the reaction chamber; a power source unit that generates plasma in the reaction chamber; and a flow control unit that evacuates the reaction chamber to form a vacuum state therein and that controls a flow of gas; evacuating the reaction chamber to form a vacuum state therein; supplying the first process gas and the atmospheric gas into the reaction chamber that is in the vacuum state; fixing the pressure of the reaction chamber so that the supplied first process gas and atmospheric gas are continuously present in a steady state in the reaction chamber; forming nanoparticles by generating a plasma in the reaction chamber and supplying a second process gas in a pulsed manner; and collecting the formed nanoparticles in the nanoparticle housing region of the reaction chamber.

According to an aspect of the method, plasma may be generated in the nanoparticle forming region of the reaction chamber in a continuous manner, and nanoparticles formed in the nanoparticle forming region may be transferred to the nanoparticle housing region of the reaction chamber due to a force of the second process gas supplied in the pulsed manner.

According to an aspect of the method, the second process gas may be supplied in the pulsed manner at a flow rate of at least about 5 times, or more specifically, at least about 10 times the flow rate of the first process gas.

According to an aspect of the method, the plasma is applied to the nanoparticle forming region of the reaction chamber in a pulse manner, wherein an on-time of the plasma applied in the pulse manner and an on time of the second process gas supplied in the pulse manner are finished at the same time, wherein the on time of the plasma applied in the pulse manner is longer than the on time of the second process gas supplied in the pulse manner.

According to an aspect of the method, the plasma applied in the pulsed manner and the second process gas supplied in the pulsed manner all are in an off-time, nanoparticles formed in the nanoparticle forming region are housed in the nanoparticle housing region.

According to an embodiment, a method of producing nanoparticles includes evacuating a reaction chamber to form a vacuum state therein, wherein the reaction chamber includes a division member that is grounded and divides the reaction chamber into a nanoparticle forming region and a nanoparticle housing region that includes a nanoparticle housing device, supplying a first process gas and an atmospheric gas into the reaction chamber that is in the vacuum state; maintaining the pressure of the reaction chamber so that the supplied first process gas and atmospheric gas are continuously present in a steady state in the reaction chamber; generating a plasma in the reaction chamber while supplying a second process gas in a pulsed manner such that nanoparticles are formed in the nanoparticle forming region; and collecting the formed nanoparticles on the nanoparticle housing device in the nanoparticle housing region of the reaction chamber.

One or more embodiments may include nanoparticles having the average size of about 250 nm or less including a compound represented by Formula 1:

$$Q1\text{-}X_a$$

where Q1 is selected from the group consisting of Si, Ti, B, Sb, Pb, and Ge;
X is selected from the group consisting of H, O, C, B, P, and N; and
a is a real number in the range of about 0.01 to about 4.

One or more embodiments may include nanoparticles having the average size of about 250 nm or lower, wherein each nanoparticle includes a core formed of Q2 and a shell represented by Formula 2 covering the core:

$$Q2\text{-}Y_b \qquad \text{<Formula 2>}$$

where Q2 is selected from the group consisting of Si, Ti, B, Sb, Pb and Ge;
Y is selected from the group consisting of H, O, C, B, P and N; and
b is a real number in the range of about 0.01 to about 4.

The nanoparticles may be produced using a method according to described above.

One or more embodiments may include a lithium battery including an electrode including the nanoparticles.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 1A is a flowchart illustrating a method of producing nanoparticles, according to an embodiment;

FIG. 5A is a flowchart illustrating an operation for forming and collecting nanoparticles in a method of producing nanoparticles according to another embodiment;

FIG. 5B is a schematic view of the pulse shape of plasma and the pulse shape of a second process gas which are to be supplied in an operation for forming and collecting nanoparticles, according to an embodiment.

DETAILED DESCRIPTION

Figure 1B:
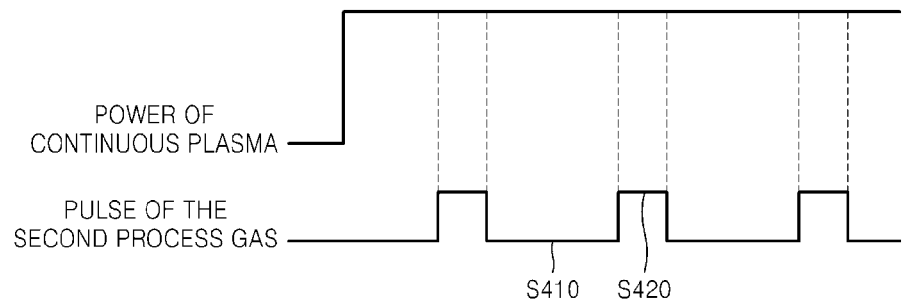
FIG. 1B is a schematic view illustrating a pulse shape of a second process gas used in the method described with reference to FIG. 1A, according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a method of producing nanoparticles according to an embodiment will be described in detail. It should be noted that sizes or widths of elements illustrated in the drawings are enlarged for convenience of explanation.

FIG. 1A is a flowchart illustrating a method of producing nanoparticles, according to an embodiment, and FIG. 1B is a schematic view illustrating a pulse shape of a second process gas supplied into a reaction chamber according to the method illustrated in FIG. 1A, together with a continuous plasma power, according to an embodiment.

Preparation of Apparatus for Producing Nanoparticles

Figure 2A:
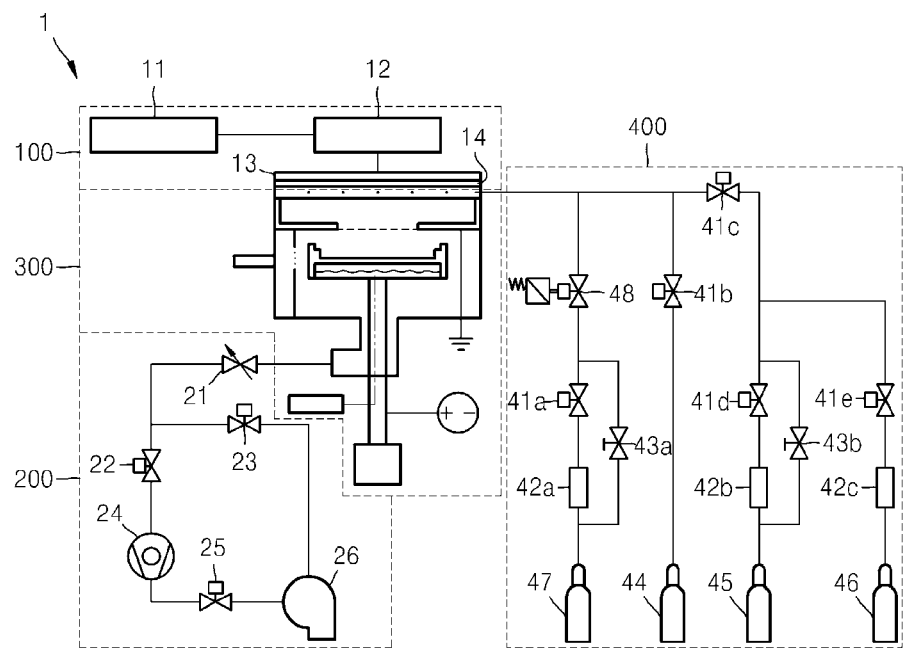
FIG. 2A illustrates an apparatus for producing nanoparticles which can be used to perform a method of producing nanoparticles according to an embodiment.
Figure 2B:
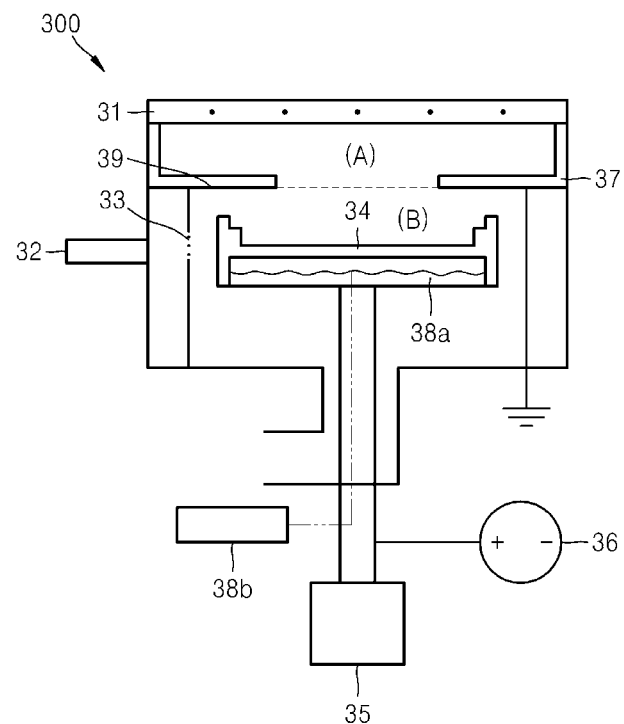
FIG. 2B is an enlarged schematic view of a reaction chamber included in the apparatus illustrated in FIG. 2A, according to an embodiment.
Figure 2C:
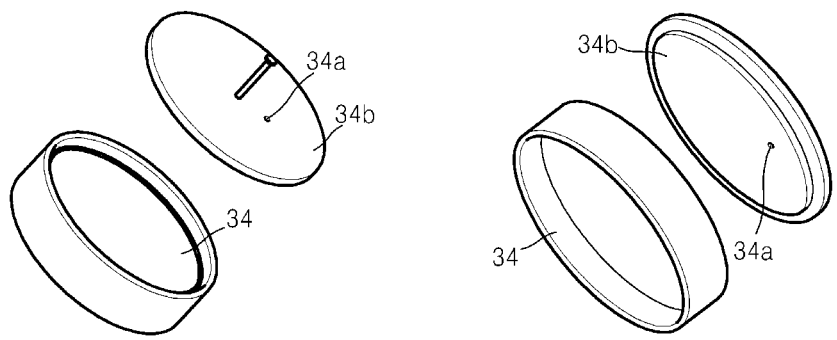
FIG. 2C is an enlarged schematic view of a nanoparticle collecting chamber included in the reaction chamber illustrated in FIG. 2B, according to an embodiment.

Although not illustrated in FIG. 1A, first, an apparatus that produces nanoparticles is provided. FIG. 2A illustrates an apparatus 1 for producing nanoparticles, FIG. 2B is an enlarged schematic view of a reaction chamber 300 of the apparatus 1 illustrated in FIG. 2A, and FIG. 2C is an enlarged schematic view of a nanoparticle collecting chamber 34 of the apparatus 1 illustrated in FIG. 2A, wherein the nanoparticle collecting chamber 34 is an example of a nanoparticle housing device.

Referring to FIG. 2A, the apparatus 1 that produces nanoparticles includes a reaction chamber 300, a gas supply unit 400, a power source unit 100 and a flow control unit 200.

The reaction chamber 300 may include a gas inlet 31 through which gas enters, a nanoparticle collecting chamber 34 that houses produced nanoparticles, and a division member 39 that is grounded and divides the reaction chamber 300 into a nanoparticle forming region A and a nanoparticle housing region B.

The nanoparticle forming region A in the reaction chamber 300 may be formed between the gas inlet 31 through which gas enters and the division member 39.

The division member 39 may be a metallic member that is perforated in such a way that nanoparticles can move from the nanoparticle forming region A to the nanoparticle housing region B. For example, the division member 39 may be a grounded metallic grid, but is not limited thereto.

The nanoparticle housing region B may include the nanoparticle collecting chamber 34, which is an example of a nanoparticle housing device.

The nanoparticle collecting chamber 34 may be separable from the reaction chamber 300 so that nanoparticles can be used in a subsequent separate process. Accordingly, when the nanoparticle collecting chamber 34 is used, nanoparticles may be more easily collected.

Also, as illustrated in FIG. 2B, an inner wall of the nanoparticle collecting chamber 34 may be terraced in consideration of the pathway of nanoparticles. Accordingly, while the interior pressure of the reaction chamber 300 is not affected, nanoparticles moving through various pathways may be collected and thus, nanoparticles may be more efficiently captured.

The nanoparticle collecting chamber 34 may be formed of an insulator. When the nanoparticle collecting chamber 34 is formed of an insulator, interference between a DC voltage applied by a DC bias power source device 36 and AC voltage of plasma is prevented and thus the occurrence of arcing in plasma can be reduced. Accordingly, the voltage of the DC bias power source device 36 may be increased to as much as about 200 V or more and thus a strong electrical attraction can be applied to nanoparticles and nanoparticles can be more efficiently captured. For example, the nanoparticle collecting chamber 34 may be formed of TEFLON or polyetheretherketone (PEEK) which are known insulators and do not affect the degree of a vacuum.

If the nanoparticle collecting chamber 34 is formed of a material having a dielectric constant that is too low, or if a wall of the nanoparticle collecting chamber 34 is too thick, the nanoparticle capturing effect generated due to the DC voltage may be reduced. Accordingly, it is desirable to carefully consider the factors described above when a material for forming the nanoparticle collecting chamber 34 is chosen.

Also, the nanoparticle collecting chamber 34 may further include a height controller 35 to additionally obtain a capturing effect generated due to impact caused by inertia of motion of variously-sized particles.

The nanoparticle collecting chamber 34 may include a lid 34b having a reagent supply hole 34a, as illustrated in FIG. 2C. By using the lid 34b, nanoparticles collected in the nanoparticle collecting chamber 34 after nanoparticles are produced can be protected from the external atmosphere and moisture, and a needed regent may be supplied into the collecting chamber 34 through the reagent supply hole 34a of the lid 34b.

Although not illustrated in FIG. 2B, another example of a nanoparticle housing device is a wafer. That is, a wafer that has been subjected to other thin film forming processes may be loaded into the reaction chamber 300 and placed in the nanoparticle housing region B and then nanoparticles may be deposited on a surface of the wafer. Specifically, particles may be deposited and patterned on a surface-characterized wafer by electric attraction. This technique may be applied to produce various devices, such as next-generation memories or sensors, using nanoparticles.

The reaction chamber 300 may further include the DC bias power source device 36 to increase a particle capturing efficiency in the nanoparticle collecting chamber 34, a heater 38a to produce crystalline particles, and a heater controller 38b to control the heater 38a.

The DC bias power source device 36 applies a DC voltage to the nanoparticle collecting chamber 34 so that negatively charged nanoparticles can be more efficiently captured by electric attraction. For example, the DC voltage may be about −500 VDC to about +500 VDC. The DC voltage may be selected within that range in consideration of the dielectric constant of a material that forms the nanoparticle collecting chamber 34, the thickness of the nanoparticle collecting chamber 34, a distance between the nanoparticle collecting chamber 34 and the division member 39, and whether arcing occurs in plasma.

When the captured nanoparticles are non-crystalline, the heater 38a and the temperature controller 38b may be used to anneal the non-crystalline nanoparticles to form crystalline nanoparticles.

The reaction chamber 300 may further include a view port 32 that is formed on a sidewall of the reaction chamber 300. Various measurement apparatuses including an apparatus for measuring the state of plasma may be installed in the view port 32. The reaction chamber 300 may further include a transparent plastic cover 33 on the division member 39 so that the nanoparticle housing region B may be viewed. The state of plasma may be monitored through the view port 32 and the transparent plastic cover 33, and data for various apparatuses, such as a Langmuir probe, may be measured through the view port 32. The view port 32 may be connected to the transparent plastic cover 33 to view particles that have moved to the outside of the reaction chamber 300 while a process is performed. For particles that have moved outside of the reaction chamber 300, a particle size distribution may be identified using a low pressure differential mobility analyzer (DMA) or a particle beam mass spectrometer (PBMS). In addition, these particles may be further moved to another chamber in order to perform a subsequent process.

The reaction chamber 300 may further include a nanoparticle-capturing device 37. The nanoparticle-capturing device 37 may have a nozzle-like hole. Like conventionally available impactors, the nanoparticle-capturing device 37 reduces a cross-section inside the reaction chamber 300 so that the behavior of nanoparticles is controlled in such a way that nanoparticles move to be as close to the center of the reaction chamber 300 as possible. As a result, nanoparticles can be more efficiently moved to the nanoparticle housing region B. For example, the nanoparticle-capturing device 37 may prevent the flow of nanoparticles and gas into a space between the division member 39 and a wall of the reaction chamber 300 to some extent. Thus, a phenomenon in which nanoparticles stay around the wall of the reaction chamber 300 may not occur and more nanoparticles may move to the nanoparticle housing region B.

As illustrated in FIG. 2B, when the nanoparticle collecting chamber 34 and the nanoparticle-capturing device 37 are used, the smaller the distance between the division member 39 that is grounded and each of the nanoparticle collecting chamber 34 and the nanoparticle-capturing device 37, the more nanoparticles may be collected. However, if the distance is too small, the resultant space between the grounded division member 39 and each of the nanoparticle collecting chamber 34 and the nanoparticle-capturing device 37 functions as a nozzle and thus, the pressure of the nanoparticle forming region A may differ from the pressure of the nanoparticle housing region B. In addition, plasma may affect a surface of the nanoparticle collecting chamber 34 or an unpredicted arcing may occur. Therefore, the distance between the grounded division member 39 and each of the nanoparticle collecting chamber 34 and the nanoparticle-capturing device 37 may be at least 1 cm.

The gas supply unit 400 may include a first process gas 45, an atmospheric gas 46, a purge gas 44, and a second process gas 47. Valves 41a through 43b control the pipes through which respective gases flow and a flow rate.

The first process gas 45 may be a precursor gas that chemically reacts in plasma and contains an element that forms nanoparticles to be produced. For example, the first process gas 45 may be an Si-containing gas that is used to produce Si-based nanoparticles, or gas that is prepared by evaporating a liquid precursor that is used to produce particular nanoparticles. Specifically, to produce Si-containing nanoparticles, the first process gas may be an Si-containing gas such as a silane-based gas, such as, for example, $SiH_4$, $SiCl_4$, $Si_2H_6$, $SiH_2Cl_2$, or $SiF_4$. To produce B-containing nanoparticles, $B_2H_6$, for example, may be used as the first process gas 45. In addition, a liquid precursor can be used after being evaporated. To produce Ti-containing nanoparticles, titanium tetraisopropoxide (TTIP; $Ti(OC_3H_7)$), for example, may be used as the first process gas 45. More generally, the first process gas 45 may be any gas that contains an element of the nanoparticles to be produced and that reacts in plasma. The atmospheric gas 46 is a gas that controls the flow of gas in the reaction chamber 300. The atmospheric gas 46 may be selected from gases that do not chemically react with the first process gas 45 and the second process gas 47. For example, the atmospheric gas 46 may be an inert gas, such as Ar gas, but is not limited thereto.

The purge gas 44 is a gas that purges the residual process gases and the atmospheric gas 46 in order for the inside of the reaction chamber 300 to be in an atmospheric pressure state. The purge gas 44 may be any known purge gas such as nitrogen gas or carbon dioxide gas.

The second process gas 47 may be supplied into the reaction chamber 300 in a pulsed manner. Accordingly, a pipe supplying the second process gas 47 may include a D/V valve 41a, a mass flow controller 42a, and a high-speed pulse valve 48. The second process gas 47 pushes nanoparticles to the nanoparticle housing region B and also, chemically reacts in the nanoparticle region A containing the first process gas 45 and plasma, thereby forming nanoparticles. Accordingly, the second process gas 47 may be chosen in consideration of nanoparticle-forming elements. For example, the second process gas 47 may be $H_2$ gas, $O_2$ gas, $CH_4$ gas, $B_2H_6$ gas, $PH_3$ gas or $N_2$ gas, but is not limited thereto. In addition, like the first process gas 45, a liquid precursor such as $H_2O$ may be evaporated and used as the second process gas 47.

Meanwhile, according to the components and use objectives of nanoparticles to be produced, the first process gas 45 and the second process gas 47 may be selectively alternated. However, for nanoparticles including a core formed of Q2 and a shell formed of a compound represented by Formula 2 covering the core, which will be described later, the first process gas 45, which is a precursor of the core, may be a gas that includes an element for producing a solid particle. In such a case, $H_2$ gas and $O_2$ gas would not be used as the first process gas 45.

The power source unit 100 may include a plasma source 13 to store plasma and a pulse RF generation device 11 that applies the plasma in a pulsed manner. In addition, as illustrated in FIG. 2A, the power source unit 100 may further include a matching system 12 that transfers RF power generated in the pulse RF generation device 11 to the plasma source 13 and a ceramic plate 14.

By using the power source unit 100, the application method (continuous application or pulse application), application periods, and application time (on time) of the plasma can be controlled.

The flow control unit 200 may include a vacuum forming member to evacuate the reaction chamber 300 and a flow rate controller to control the flow of gas to obtain a steady state after the gas is supplied.

As the vacuum forming member, a turbo molecular pump 24 may be used alone, or the turbo molecular pump 24 may be used together with a turbo molecular pump 24 and a rotary pump 26. However, the vacuum forming member is not limited thereto.

As a flow rate controller, a throttle valve 21 is installed to maintain the flow rate in the reaction chamber 300 at a steady state. In this regard, the throttle valve 21 may be linked to a manometer in the reaction chamber 300 and may be automatically controlled.

Referring to FIG. 2A, the flow control unit 200 includes, in addition to the throttle valve 21, a main angle valve 22, a roughing valve 23 and a foreline valve 25.

When the flow rate controller is used to maintain the pressure of the reaction chamber 300 at a few mTorr to hundreds of mTorr and to maintain the flow rate of gas in the reaction chamber 300 at a steady state, variable effects that affect production of particles can be minimized and nanoparticles having a uniform size can be produced.

Evacuating the Reaction Chamber 300 (S100 in FIG. 1A)

An apparatus for producing nanoparticles is provided as described above, and then the reaction chamber 300 (see FIG. 2B) is evacuated. Although the vacuum pressure is not limited, the vacuum pressure may be about $10^{-6}$ Torr to remove impurities and moisture from the reaction chamber 300, because impurities and moisture may affect production of nanoparticles.

Supplying first process gas 45 and atmospheric gas 46 (S200 in FIG. 1A)

Referring to FIG. 2A, a first process gas 45 and an atmospheric gas 46 are supplied by a gas supply unit 400 into the reaction chamber 300 that is in a vacuum state. The flow rate of the first process gas may be about 0.01 sccm to about 100 sccm, and the flow rate of the atmospheric gas may be about 1 sccm to about 1000 sccm. These flow rates may be varied according to the size of nanoparticles to be produced, the plasma power, the interior pressure of the reaction chamber 300, or the size of the reaction chamber 300. For example, for a 6-inch wafer chamber, the flow rate of the first process gas 45 may be about 0.01 sccm to about 3 sccm and the flow rate of the atmospheric gas 46 may be about 1 sccm to about 50 sccm.

Gas may be supplied by the pressure of compressed gas itself, or, when a liquefied gas is used, an evaporator may be additionally used.

Fixing the Pressure of the Reaction Chamber 300 (S300 in FIG. 1A)

The pressure of the reaction chamber 300 is fixed to maintain the flow rate of the gas supplied into the reaction chamber 300 at a steady state. When the gas is supplied into the reaction chamber 300 that is in a vacuum state, the pressure of the gas in the reaction chamber 300 can be fixed using a flow rate controller. The flow rate of gas affects the size and density of nanoparticles to be formed. Accordingly, when the flow of gas is controlled to be a steady state, the effect of the gas flow rate on the production of nanoparticles may be minimized.

The pressure of the reaction chamber 300 may be controlled to be a few mTorr to hundreds of mTorr or an atmospheric pressure in consideration of characteristics of the nanoparticles. Further, the gas flow rate and the volume of the reaction chamber 300 may be taken into consideration in determining the pressure of the reaction chamber 300. If the pressure of the reaction chamber 300 is too low, no nanoparticles are formed. In addition, various nanoparticles are formed depending on the pressure of the reaction chamber 300 and flow rates of the first and second process gases 45 and 47 and the atmospheric gas 46. Accordingly, the pressure of the reaction chamber 300 and flow rates of the first and second process gases 45 and 47 and the atmospheric gas 46 can be appropriately controlled according to characteristics of nanoparticles to be produced.

Forming and Housing Nanoparticles (S400 in FIG. 1A)

As illustrated in FIG. 1B, plasma power is uniformly applied and a second process gas 47 is supplied into the reaction chamber 300 in a pulsed manner.

First, in S410, when plasma is applied and the second process gas 47 is not supplied, (the "off time"), particle nuclei are generated using the first process gas 45 and the second process gas 47 which has been supplied during a period prior to the current period and remains in the reaction chamber 300, and the generated particle nuclei grow in the reaction chamber 300. Since the generated particles are still arrested by the plasma, the generated particles continuously grow due to plasma energy. Then, in S420, when the plasma is applied and the second process gas 47 is supplied (the "on time"), growing particles that are being arrested by the plasma are moved to the nanoparticle housing region B (see FIG. 2B) due to supply force of the second process gas 47 and are then housed in the nanoparticle collecting chamber 34 (see FIG. 2B). In the nanoparticle collecting chamber 34, the growth of the nanoparticles is suppressed. The cycle of S410 and S420 is repeated a plurality of times to produce nanoparticles having an average size of about 200 nm or lower. To control the particle size, the time period for S410 may be controlled. If the time period for S410 is prolonged to increase the particle size, there may not be any of the second process gas 47 remaining in the reaction chamber 300 by the end of the prolonged period, and thus, nanoparticles having an undesired composition may be produced. Thus, the time period for S410 may be less than about 90% of one cycle.

If the second process gas 47 is appropriately controlled to be still remaining within the reaction chamber 300 by the time the second process gas 47 is supplied by the next pulse, nanoparticles may grow using the first process gas 45 and the second process gas 47 during S410 of FIG. 1B. To provide that the second process gas 47 remains sufficiently in the reaction chamber 300, when the second process gas 47 is supplied, the flow rate of the second process gas 47 is controlled to be greater than the flow rate of the first process gas 45. For example, when the second process gas 47 is supplied, the flow rate of the second process gas 47 may be at least about 5 times the flow rate of the first process gas 45. More specifically, the flow rate of the second process gas 47 may be at least about 10 times the flow rate of the first process gas 45, or even more specifically, 10 to 100 times the flow rate of the first process gas 45. As a result, composite nanoparticles derived from the first process gas 45 and the second process gas 47 may be obtained. The composite nanoparticles may comprise a compound represented by Formula 1 and the average particle size of the composite nanoparticles may be about 250 nm:

$$Q1-X_a \qquad \text{<Formula 1>}$$

where Q1 is selected from the group consisting of Si, Ti, B, Sb, Pb, and Ge;
X is selected from the group consisting of H, O, C, B, P, and N; and
a is a real number in the range of about 0.01 to about 4.

For example, in Formula 1, Q1 may be Si.

In Formula 1, Q1 may be determined according to the selection of the first process gas 45 and X may be determined according to the selection of the second process gas 47. In addition, the average size of the nanoparticles may be determined according to the flow rate of the second process gas 47 when supplied, the time period for which gas is supplied, the pulse period, the continuous plasma power, etc.

For example, the continuous plasma power may be greater than 0 W and up to about 600 W, and the flow rate of the second process gas 47 during the on time may be greater than 0 sccm and up to about 50 sccm. However, the continuous plasma power and the flow rate of the second process gas 47 at on time are not limited to these ranges. The amount of time during which the second process gas 47 is supplied, i.e., the on time, may be about 1% to about 90% of one pulse period. For example, if the pulse period of the second process gas 47 is set to 1 second, the time period during which the second process gas 47 is supplied may be about 0.01 seconds to about 0.9 seconds.

The capturing of the nanoparticles may be more effectively performed, in addition to applying force using the second process gas 47, by applying a DC bias power 36 to the nanoparticle collecting chamber 34 in order to additionally apply an electric attraction to the nanoparticles and by controlling the flow line of the nanoparticles using the nanoparticle-capturing device 37 so that the nanoparticles effectively move to the nanoparticle housing region B. When the nanoparticle-capturing device 37 is used, the capture of nanoparticles may be more effectively improved by controlling the height of the nanoparticle collecting chamber 34.

Collecting Nanoparticles (S700 in FIG. 1A)

After nanoparticles are captured as described above, referring to FIG. 2B, the nanoparticle collecting chamber 34 may be separated from the reaction chamber 300 to collect nanoparticles. In this case, although not illustrated in FIG. 1A, before the nanoparticle collecting chamber 34 is separated, nanoparticles may be annealed using a heater 38a to produce crystalline nanoparticles.

In particular, after the reaction chamber 300 is restored to an atmospheric pressure state, the nanoparticle-capturing device 37 and the division member 39, which may be grounded, are removed as quickly as possible, and immediately after the removal, the nanoparticle collecting chamber 34 is covered with a lid 34b to collect the nanoparticles. If necessary, an anti-oxidant reagent, such as THF, may be additionally added to the nanoparticle collecting chamber 34 through the reagent supply hole 34a.

Figure 3A:
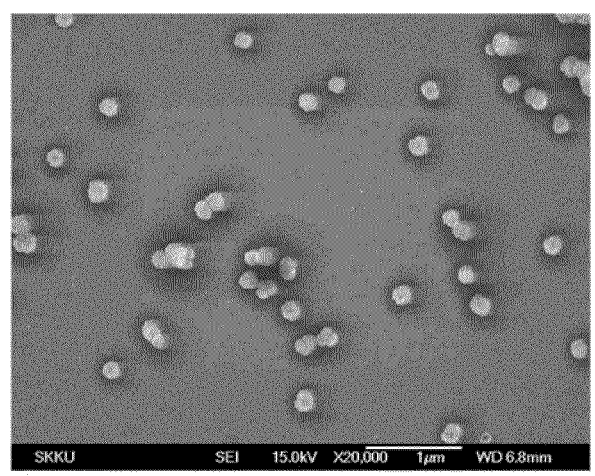
FIGS. 3A and 3B are transmission electron microscopic (TEM) images of nanoparticles according to an embodiment.
Figure 3B:
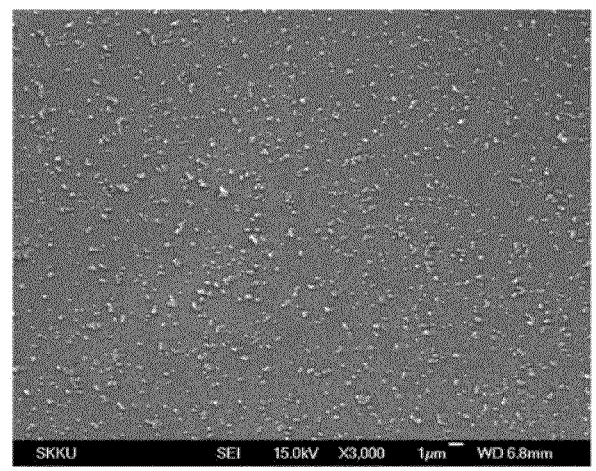

FIGS. 3A and 3B are transmission electron microscopic (TEM) images of nanoparticles produced using the apparatus 1 for producing nanoparticles illustrated in FIGS. 2A, 2B and 2C and the method of producing nanoparticles described with reference to FIGS. 1A and 1B. Detailed production conditions for such nanoparticles are shown in Table 1:

TABLE 1

| | |
|---|---|
| Pressure of the reaction chamber 300 | 300 mTorr |
| First process gas 45 | Silane ($SiH_4$) gas, 1 sccm |
| Atmospheric gas 46 | Ar gas, 10 sccm |
| Continuous plasma power | 200 W |
| Second process gas 47 | $H_2$ gas, 20 sccm (flow rate at on time) On time: 0.1 sec, Off Time: 0.9 sec Pulse period: 1 second |
| DC bias voltage | +200 VDC |

Referring to FIGS. 3A and 3B, it can be seen that the nanoparticles did not agglomerate and the average particle size of the nanoparticles was about 208 nm. Accordingly, it can be identified that due to the supply force of the second process gas 47, which is supplied in the pulse manner, the particle size was effectively controlled and agglomeration of nanoparticles was effectively prevented.

Figure 4:
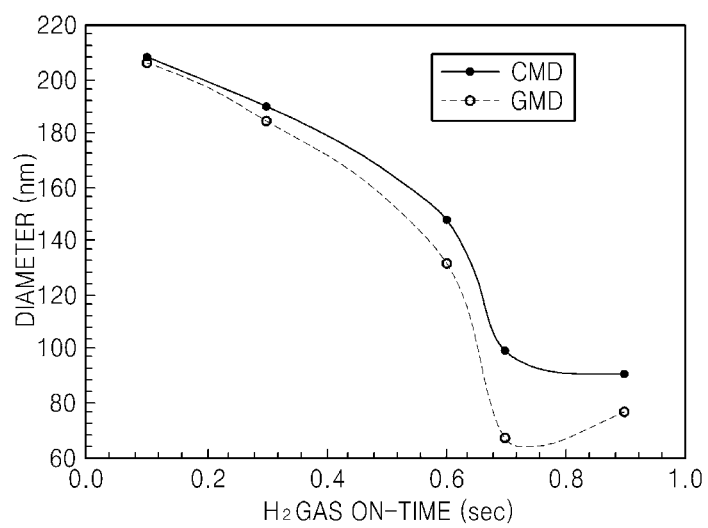
FIG. 4 is a graph showing average particle size of nanoparticles produced according to an embodiment with respect to on-time of a second process gas.

Among the conditions shown in Table 1, the on time of $H_2$ gas, which is the second process gas 47, was changed to produce various nanoparticles. For each case, the produced nanoparticles were collected and then dispersed in isopropyl alcohol (IPA). Then, the count mean diameter (CMD) and geometric mean diameter (GMD) of the nanoparticles were measured. The results are shown in FIG. 4, which is a graph showing the average particle size of the nanoparticles produced with respect to the on time of the second process gas 47. Referring to FIG. 4, as the on time of the second process gas 47 was increased and the off time of the second process gas 47 was decreased in one period, the time required for growing the nanoparticles decreased, and thus the CMD and the GMD of the nanoparticles decreased. Accordingly, it can be seen that the average size of nanoparticles can be adjusted by controlling the duration of pulse of the second process gas 47.

A method of producing nanoparticles according to another embodiment is the same as the method of producing nanoparticles illustrated in FIG. 1A, except that S600 is performed instead of S400 of the method of FIG. 1A, as shown in the flowchart provided in FIG. 5A. In S600, a pulsed plasma is applied, and the second process gas 47 is supplied in a pulsed manner. FIG. 5B is a schematic view of the pulse shape of the applied pulsed plasma and the pulse shape of the second process gas 47 in S600 illustrated in FIG. 5A. In S610, in which plasma is applied and the second process gas 47 is not supplied, nuclei of cores are generated using the first process gas 45 and grow in the reaction chamber 300. Then, in S620, in which the plasma is applied and the second process gas 47 is supplied, a shell is formed using the first process gas 45 and the second process gas 47 on the core. Then, in S630 in which the plasma is not applied and the second process gas is not supplied, since plasma is not applied to the formed nanoparticles, the nanoparticles move from the plasma region, that is, the nanoparticle forming region A, to the nanoparticle housing region B of the reaction chamber 300 due to inertial force and electric attraction. As a result, the growth of nanoparticles is suppressed. Accordingly, the nanoparticles have a core-shell structure and the average particle size of the nanoparticles is controlled to be about 250 nm or less. The nanoparticles produced may include a core formed of Q2 and a shell formed of a compound represented by Formula 2 covering the core. The average size of the nanoparticles may be about 250 nm:

$$Q2-Y_b \qquad \text{<Formula 2>}$$

where Q2 is selected from the group consisting of Si, Ti, B, Sb, Pb and Ge;
Y is selected from the group consisting of H, O, C, B, P and N; and
b is a real number in the range of about 0.01 to about 4.

For example, in Formula 2, Q2 may be Si and Y may be H.

Q2 may be derived from the first process gas 45, and Y may be derived from the second process gas 47. Meanwhile, the average size of the core, the thickness of the shell, and the average size of the nanoparticles may be controlled by adjusting the strength of the plasma power source, the pulse period of the applied plasma, and the pulse period of the supplied second process gas.

To produce nanoparticles having the core-shell structure as described above, the supply of the plasma and the supply of the second process gas 47 may be ended at the same time, and the on time of the plasma may be longer than the on time of the second process gas 47, as illustrated in FIG. 5B.

To produce nanoparticles having the core-shell structure as described above, the time period for S630, that is, the time period when the plasma and the second process gas 47 are not supplied, may be long enough such that all the second process gas 47 is removed from the reaction chamber 300. When the second process gas 47 is not present at the start of a new period in S610, only the first process gas 35 and the atmospheric gas 46 are present in the reaction chamber 300 and thus, a core formed using only the first process gas 45 may be formed in S610.

In S600, the plasma application power may be greater than 0 W and up to about 600 W, and the pulse frequency of pulse plasma may be over 0 Hz and up to about 50 Hz. The on time (supply time) of the plasma pulse may be about 0.6% to about 34% of one pulse period (that is, the total time of a single iteration of S610, S620 and S630). For example, if the pulse period is set to 3 seconds, the on time of the plasma may be in a range of about 0.02 seconds to about 1 second. The on time of the second process gas 47 may be in a range of about 0.34% to about 33% of one pulse period. For example, if the pulse period is set to 3 seconds, the on time of the second process gas 47 may be about 0.01 seconds to about 0.98 seconds. During the on time of the second process gas 47, the flow rate may be about 0.1 sccm to about 1000 sccm, and may vary according to the size of nanoparticles, the plasma power, the interior pressure of the reaction chamber 300, or the size of the reaction chamber 300. For example, for a 6-inch wafer chamber, the flow rate of the second process gas 47 during the on time may be about 0.1 sccm to about 50 sccm.

Figure 6A:
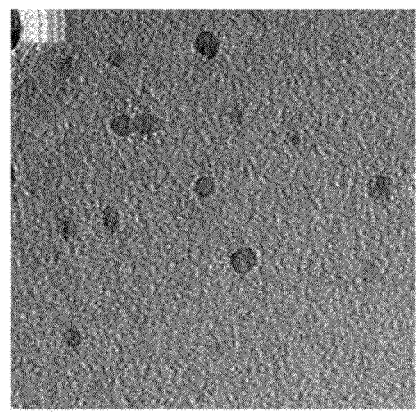
FIG. 6A is a TEM image of nanoparticles according to another embodiment.

FIG. 6A is a transmission electron microscopic (TEM) image of nanoparticles produced using the apparatus 1 for producing nanoparticles illustrated in FIGS. 2A, 2B and 2C and the method of producing nanoparticles described with reference to FIGS. 5A and 5B, wherein S100, S200, S300, and S700 of the method have already been described with reference to FIG. 1A. Detailed production conditions for such nanoparticles are shown in Table 2:

TABLE 2

| | |
|---|---|
| Pressure of the reaction chamber 300 | 300 mTorr |
| First process gas 45 | Silane (SiH$_4$) gas, 0.01 sccm |
| Atmospheric gas 46 | Ar gas, 10 sccm |
| Continuous plasma power | power: 200 W |
| | On time: 0.03 sec, Off Time: 2.97 sec |
| | pulse period: 3 sec |
| Second process gas 47 | H$_2$ gas, 0.2 sccm (flow rate during on time) |
| | On time: 0.01 sec, Off Time: 2.99 sec |
| | pulse period: 3 sec |
| DC bias voltage | +100 VDC |

Referring to FIG. 6A, it can be seen that the nanoparticles did not agglomerate and the average particle size of the nanoparticles was about 5.85 nm.

Figure 6B:
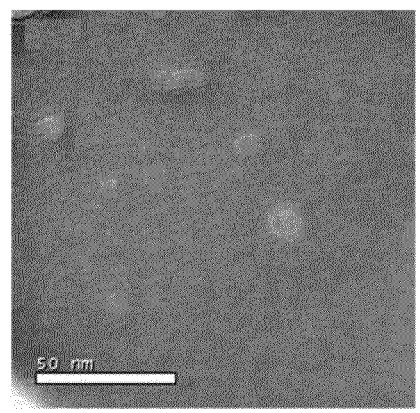
FIGS. 6B and 6C respectively show mapping images of silicon and hydrogen of the nanoparticles shown in FIG. 6A.
Figure 6C:
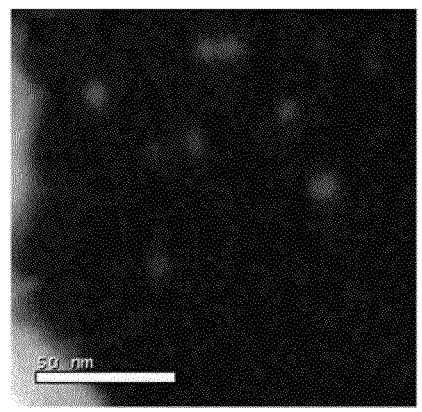

FIG. 6B shows a TEM electron energy loss spectroscopic (EELS) mapping image of silicon of the nanoparticles, and FIG. 6C shows a TEM EELS mapping image of hydrogen of the nanoparticles. According to these mapping images, the core-shell structure may be identified.

According to another embodiment, nanoparticles formed of a compound represented by Formula 1 having an average diameter of about 250 nm or less are provided:

$$Q1-X_a \qquad \text{<Formula 1>}$$

where Q1 is selected from the group consisting of Si, Ti, B, Sb, Pb and Ge;
X is selected from the group consisting of H, O, C, P, B and N; and
a is a real number in the range of about 0.01 to about 4.

For example, Q1 may be Si.

According to another embodiment, nanoparticles may be provided having a core-shell structure and an average diameter of about 250 nm or less, wherein the core may be formed of Q2 and the shell may be represented by Formula 2 and cover the core:

$$Q2-Y_b \qquad \text{<Formula 2>}$$

where Q2 is selected from the group consisting of Si, Ti, B, Sb, Pb and Ge;
Y is selected from the group consisting of H, O, C, B, P and N; and
b is a real number in the range of about 0.01 to about 4.

For example, in Formula 2, Q2 may be Si and Y may be H.

In the embodiments described above, Q1 and Q2 may be derived from the first process gas 45, and X and Y may be derived from the second process gas 47.

For nanoparticles that include the core formed of Q2 and the shell formed of the compound represented by Formula 2 covering the core, the shell may function as a protection layer for preventing oxidation of the core. As a result, the nanoparticles may bring about various performance improvements when used in various devices such as batteries. For example, when such nanoparticles having the core-shell structure are used as an electrode material of a lithium battery used in plug-in hybrid electric vehicles (PHEV), desired battery characteristics required for PHEVs, such as high-capacity and/or long lifetime, may be achieved.

Such nanoparticles may be used in various devices such as semiconductor memory devices or batteries. Specifically, such nanoparticles may be used as an anode active material of a lithium battery. According to another embodiment, a lithium battery is provided, including a cathode, an anode, and an electrolyte, wherein the anode includes nanoparticles as described above or nanoparticles produced using one of the methods of producing nanoparticles as described above. Specifically, the anode includes a collector and an active material layer formed on the collector, wherein the active material layer may include a binder and nanoparticles as described above or nanoparticles produced using a method of producing nanoparticles as described above.

A method of forming the anode of the lithium battery according to an embodiment will now be described in detail. First, the above-described nanoparticles, a binder and a solvent are mixed to prepare an anode active material composition, and then the anode active material composition may be directly coated on a collector to produce the anode. Alternatively, the anode active material composition may be cast onto a separate support, and then, an anode active material film exfoliated from the support may be laminated onto a copper collector to produce the anode. The anode may further include a conducting agent.

To prepare the cathode, a cathode active material, a conducting agent, a binder and a solvent may be mixed to prepare a cathode active material composition. The cathode active material composition may be directly coated onto an aluminum collector and dried to prepare the cathode. Alternatively, the cathode active material composition may be cast onto a separate support, and then, a cathode active material film exfoliated from the support may be laminated onto the aluminum collector to prepare the cathode.

The cathode active material may be any lithium-containing metal oxide that is conventionally used in the art without limitation. Examples of the cathode active material include $LiCoO_2$, $LiMn_xO_{2x}$, $LiNi_{x-1}Mn_xO_{2x}$ where x=1, 2, and $Ni_{1-x-y}Co_xMn_yO_2$ where $0 \leq x \leq 0.5$ and $0 \leq y \leq 0.5$. For the cathode active material composition, the conducting agent, the binder and the solvent may be the same as those of the anode. In this regard, the amounts of the cathode active material, the conducting agent, the binder and the solvent may be the same as in a conventional lithium battery.

The lithium battery may further include a separator. The separator may be any separator that is conventionally used in a lithium battery. Specifically, use of a separator having low resistance to ion mobility and an excellent electrolytic solution retaining property is desired. Examples of the separator include glass fiber, polyester, TEFLON, polyethylene, polypropylene, polytetrafluoroethylene (PTFE), and a combination thereof, each of which can be a nonwoven fabric or a woven fabric. For example, a lithium ion battery typically uses a winding type separator formed of polyethylene or polypropylene, and a lithium ion polymer battery typically uses a separator having an excellent organic electrolytic solution retaining capability. A method of manufacturing a separator will now be described in detail.

A polymer resin, a filler, and a solvent are mixed to prepare a separator composition. Then, the separator composition may be directly coated onto an electrode, and then dried to form a separator film. Alternatively, the separator composition may be cast onto a support and then dried to form a separator composition film, and the separator composition film exfoliated from the support may be laminated onto an electrode to form a separator film.

The polymer resin is not limited and can be any material that is used as a binder of an electrode plate. For example, the polymer resin may be a vinylidene fluoride/hexafluoropropylene copolymer, polyvinylidenefluoride, polyacrylonitrile, polymethylmethacrylate, or a mixture thereof; or the like. For example, the polymer resin may be a vinylidene fluoride/hexafluoropropylene copolymer in which the content of the hexafluoropropylene is about 8 to about 25 wt %.

The separator may be sandwiched between the cathode and the anode to form a battery assembly. The battery assembly is wound or folded such that it can be placed in a spherical battery case or a rectangular battery case, and then an electrolytic solution is supplied into the battery assembly, thereby completing the manufacture of a lithium ion battery. A plurality of such battery assemblies may be stacked in a bi-cell structure, and then dipped in an electrolytic solution. The obtained structure is placed in a pouch and sealed to complete the manufacture of a lithium ion polymer battery.

The electrolytic solution may include a lithium salt, and a mixed organic solvent including a high-k dielectric constant solvent and a low-boiling-point solvent. If desired, the electrolytic solution may further include various additives such as an agent for preventing overcharging.

The high-k solvent used in the electrolytic solution may be any solvent that is conventionally used in the art without limitation. Examples of the high-k solvent include cyclic carbonates, such as ethylene carbonate, propylene carbonate, or butylene carbonate, and gamma-butyrolactone.

The low-boiling-point solvent may also be any solvent that is conventionally used in the art without limitation. Examples of the low-boiling-point solvent include chain type carbonates, such as dimethyl carbonate, ethylmethyl carbonate, diethyl carbonate, or dipropyl carbonate, dimethoxyethane, diethoxyethane, and aliphatic ester derivatives. However, the low-boiling-point solvent is not limited thereto.

In each of the high-k solvent and low-boiling-point solvent, at least one hydrogen atom may be substituted with a halogen atom. The halogen atom may be fluorine but is not limited thereto.

The mixture volume ratio of the high-k solvent and the low-boiling-point solvent may be about 1:1 to about 1:9. If the mixture volume ratio is outside that range, desired discharge capacity and charge/discharge lifetime characteristics cannot be obtained.

Also, the lithium salt used in the electrolytic solution may be any lithium salt that is conventionally used in lithium batteries. For example, the lithium salt may include at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

In the electrolytic solution, the concentration of the lithium salt may be about 0.5 to about 2M, as a non-limiting example. If the concentration of the lithium salt is less than about 0.5 M, conductivity of the electrolytic solution is decreased and performance of the electrolytic solution may be degraded. On the other hand, if the concentration of the lithium salt is greater than about 2.0 M, the viscosity of the electrolytic solution may be increased and mobility of lithium ions may be degraded.

As described above, according to an embodiment, nanoparticles having uniform sizes or nanoparticles having a core-shell structure can be produced. When such nanoparticles are used as an electrode material of a lithium battery, a lithium battery having excellent performance can be obtained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of producing nanoparticles, the method comprising:
    providing an apparatus to produce nanoparticles, wherein the apparatus comprises:
        a reaction chamber comprising:
            a gas inlet,
            a nanoparticle housing device, and
            a division member that is grounded and divides the reaction chamber into a nanoparticle forming region and a nanoparticle housing region;
        a gas supply unit that supplies a first process gas, a second process gas and an atmospheric gas into the reaction chamber;
        a power source unit that generates plasma in the reaction chamber; and
        a flow control unit that evacuates the reaction chamber to form a vacuum state therein and that controls a flow of gas;
    evacuating the reaction chamber to form a vacuum state therein;
    supplying the first process gas and the atmospheric gas into the reaction chamber that is in the vacuum state;
    fixing the pressure of the reaction chamber so that the supplied first process gas and atmospheric gas are continuously present in a steady state in the reaction chamber;
    forming nanoparticles by generating a plasma in the reaction chamber and supplying a second process gas in a pulsed manner; and
    collecting the formed nanoparticles in the nanoparticle housing region of the reaction chamber,
    wherein the pulsed manner has a time period in which the second process gas is not supplied.

2. The method of claim 1, wherein the reaction chamber further comprises a nanoparticle-capturing device having a nozzle-like hole, and preventing nanoparticles from staying in a space between a grid support member and a wall of the reaction chamber.

3. The method of claim 1, wherein the nanoparticle housing device of the reaction chamber has a terraced wall.

4. The method of claim 1, wherein plasma is generated in the nanoparticle forming region of the reaction chamber in a continuous manner, and nanoparticles formed in the nanoparticle forming region are transferred to the nanoparticle housing region of the reaction chamber due to a force of the second process gas supplied in the pulsed manner.

5. The method of claim 4, wherein the second process gas is supplied in the pulsed manner at a flow rate that is at least about 5 times the flow rate of the first process gas.

6. The method of claim 4, wherein the second process gas is supplied in the pulsed manner at a flow rate that is at least about 10 times the flow rate of the first process gas.

7. The method of claim 1, wherein the plasma is generated in the nanoparticle forming region of the reaction chamber in a pulsed manner, wherein an on-time of the plasma applied in the pulsed manner and an on-time of the second process gas supplied in the pulse manner are terminated at the same time, wherein the on time of the plasma applied in the pulsed manner is longer than the on time of the second process gas supplied in the pulsed manner.

8. The method of claim 7, wherein, during an off time of the plasma applied in the pulsed manner and the second process gas supplied in the pulsed manner, nanoparticles formed in the nanoparticle forming region are transferred to the nanoparticle housing region.

9. The method of claim 7, wherein the nanoparticles housed in the housing region of the reaction chamber comprise:
    a core formed of Q2; and
    a shell represented by Formula 2 covering the core,
    wherein the average size of the nanoparticles is about 250 nm or lower:

$$Q2\text{-}Y_b \qquad \text{<Formula 2>}$$

where Q2 is selected from the group consisting of Si, Ti, B, Sb, Pb and Ge;
Y is selected from the group consisting of H, O, C, B, P and N; and
b is a real number in the range of about 0.01 to about 4.

10. Nanoparticles having an average size of about 5.85 nm to about 250 nm, wherein each nanoparticle comprises a core formed of Q2 and a shell represented by Formula 2 covering the core:

$$Q2\text{-}Y_b \qquad \text{<Formula 2>}$$

where Q2 is selected from the group consisting of Si, Ti, B, Sb, Pb and Ge;
Y is; and
b is a real number in the range of about 0.01 to about 4.

11. The nanoparticles of claim 10, wherein Q2 is Si.

12. A lithium battery comprising an electrode comprising the nanoparticles of claim 10.

13. A lithium battery comprising an electrode comprising the nanoparticles of claim 11.

14. A lithium battery comprising an electrode comprising the nanoparticles of claim 10.

15. A method of producing nanoparticles, the method comprising:
    evacuating a reaction chamber to form a vacuum state therein, wherein the reaction chamber includes a division member that is grounded and divides the reaction chamber into a nanoparticle forming region and a nanoparticle housing region that includes a nanoparticle housing device;
    supplying a first process gas and an atmospheric gas into the reaction chamber that is in the vacuum state;
    maintaining the pressure of the reaction chamber so that the supplied first process gas and atmospheric gas are continuously present in a steady state in the reaction chamber;
    generating a plasma in the reaction chamber while supplying a second process gas in a pulsed manner such that nanoparticles are formed in the nanoparticle forming region; and
    collecting the formed nanoparticles on the nanoparticle housing device in the nanoparticle housing region of the reaction chamber,
    wherein the pulsed manner has a time period in which the second process gas is not supplied.

16. A method of producing nanoparticles, the method comprising:
- providing an apparatus to produce nanoparticles, wherein the apparatus comprises:
  - a reaction chamber comprising:
    - a gas inlet,
    - a nanoparticle housing device, and
    - a division member that is grounded and divides the reaction chamber into a nanoparticle forming region and a nanoparticle housing region;
  - a gas supply unit that supplies a first process gas, a second process gas and an atmospheric gas into the reaction chamber;
  - a power source unit that generates plasma in the reaction chamber; and
  - a flow control unit that evacuates the reaction chamber to form a vacuum state therein and that controls a flow of gas;
- evacuating the reaction chamber to form a vacuum state therein;
- supplying the first process gas and the atmospheric gas into the reaction chamber that is in the vacuum state;
- fixing the pressure of the reaction chamber so that the supplied first process gas and atmospheric gas are continuously present in a steady state in the reaction chamber;
- forming nanoparticles by generating a plasma in the reaction chamber and supplying a second process gas in a pulsed manner; and
- collecting the formed nanoparticles in the nanoparticle housing region of the reaction chamber, wherein:
- plasma is generated in the nanoparticle forming region of the reaction chamber in a continuous manner, and nanoparticles formed in the nanoparticle forming region are transferred to the nanoparticle housing region of the reaction chamber due to a force of the second process gas supplied in the pulsed manner, and
- the second process gas is supplied in the pulsed manner at a flow rate that is at least about 5 to 10 times the flow rate of the first process gas.

* * * * *

UNITED STATES PATENT AND TRADEMARK OFFICE
CERTIFICATE OF CORRECTION

PATENT NO. : 8,530,088 B2
APPLICATION NO. : 12/418169
DATED : September 10, 2013
INVENTOR(S) : Jin-hwan Park, Tae-sung Kim and Kwang-su Kim Page 1 of 1

It is certified that error appears in the above-identified patent and that said Letters Patent is hereby corrected as shown below:

In the Claims

In claim 10 (col. 16, line 36), "Y is; and" should read -- Y is H; and --.

Signed and Sealed this
Twenty-ninth Day of October, 2013

Teresa Stanek Rea
*Deputy Director of the United States Patent and Trademark Office*